2,901,430
CORROSION INHIBITION

Max E. Chiddix, Easton, Pa., and William J. Maxcy, Hartford, and Robert L. Sundberg, Alpha, N.J., assignors to General Aniline & Film Corporation, New York, N.Y., a corporation of Delaware No Drawing. Application November 6, 1953
Serial No. 390,761

20 Claims. (Cl. 252—8.55)

This invention relates to the inhibition of corrosion and more particularly to the production of a novel composition useful, among other things, for inhibiting corrosion of metal surfaces.

It is an object of this invention to provide a quaternary ammonium compound-containing composition useful for inhibiting corrosion of metal surfaces.

A further object of this invention is to provide such a composition particularly effective for inhibiting corrosion caused by sour and sweet well effluents. The corresponding method for inhibiting corrosion and the resultant corrosion-inhibiting compositions constitute further objects of this invention. Other objects and advantages will appear as the description proceeds.

The attainment of the aforementioned objects is made possible by the instant invention, in which a corrosion inhibiting composition may be prepared by (A) reaction of one mole of a polyalkylene polyamine with two molecular equivalents of an unsaturated higher fatty acid compound, (B) reaction of the product of step A with more than sufficient alkylene oxide to condense with all the remaining replaceable N-hydrogen atoms therein, (C) reaction of one mole of the product of step B with one equivalent to one mole of an alkylating agent to form the corresponding quaternary ammonium derivative. It will be understood that the term "N-hydrogen atoms" denote hydrogen atoms attached to nitrogen.

The preferred polyalkylene polyamine to be employed in step A is diethylene triamine. However, other polyalkylene polyamines may be employed, as for example, triethylene tetramine, tetraethylene pentamine, pentaethylene hexamine, mixtures thereof, the crude amine mixture resulting from the reaction of ammonia with ethylene dichloride, and the like.

Examples of unsaturated higher fatty acids which may be reacted with the polyalkylene polyamine are oleic, ricinoleic, irucic, linolenic, elaeostearic, licanic, arachidonic, clupanodonic, lauroleic, myristoleic, palmitoleic, gadoleic, and the like. The esters of the aforementioned acids with ethanol, methanol, isopropanol, and the like, may also be employed. Fats and oils are also operative, and are desirable in view of their low cost. Examples of fats and oils which may be used are soybean, oil, sperm oil, safflower, salmon, sardine, sesame, sunflower, teaseed, tung, ucuhuba, walnut, whale, babassu, castor, coconut, cod, corn, cottonseed, dogfish, hempseed, herring, kapok, linseed, menhaden, mustard, neatsfoot, oiticica, olive, ouri-curi, palm, peanut, palm-kernel, perilla, pilchard, poppyseed, rape, rubberseed oil, and mutton or beef tallow, house grease and other naturally occurring glycerides containing unsaturated acids. It is not necessary to remove the glycerol by-product formed when using fats and oils from the intermediate diamide or from the final quaternary product. In general, all of these operative unsaturated higher fatty acids and esters thereof contain an unsaturated aliphatic radical of from about 8 to 22 carbon atoms.

The amidation reaction of step A is in general carried out at temperatures ranging from about 130 to 200° C. for a sufficient time to complete the reaction. The reaction is preferably carried out at temperatures of about 130 to 140° C., with an optional subsequent heating step at about 190–200° C. No catalyst or solvent is necessary in carrying out this amidation reaction. The product of this step is for the most part an aminodiamide compound combined with small amounts of triamides, and the like. As stated above, at least two molecular equivalents of the unsaturated higher fatty acid compound should be employed for each mole of polyalkylene polyamine. It will be understood that this requires the use of at least two moles of the free unsaturated fatty acid or at least ⅔ mole of the corresponding glyceride. Experiments have shown that amidation occurs preferentially at a secondary amino group in the polyalkylene polyamine and that even when an excess of the fatty acid compound is employed, the product is mainly composed of the diamine. For purposes of simplicity and clarity, replacement of an N-hydrogen atom by an acyl radical is referred to herein and in the appended claims as an amide formation, regardless of whether the N-hydrogen atom is in a primary amino group or a secondary amino group.

In carrying out step B of the process, the product of step A is reacted with an amount of an alkylene oxide in excess of that necessary to condense with all the remaining replaceable N-hydrogen atoms in said product. The excess alkylene oxide will react with the previously formed hydroxyalkyl groups to produce a compound having at least one polyoxyalkyl radical. In order to accomplish this, at least 4 and up to 20 moles of alkylene oxide must be reacted with each mole of the product of step A. The condensation may be carried out in well known manner in the presence of a catalytic amount of an alkaline condensing agent such as sodium hydroxide or the like, and if desired under pressure. It is preferred, however, to carry out the condensation with the alkylene oxide in the absence of an alkaline catalyst since under these conditions the amino groups in the amidated polyalkylene polyamine product of step A are more reactive than hydroxy and amide groups, whereby condensation with all remaining replaceable amino-hydrogens is insured. If desired, the initial stage of the alkoxylation may be carried out in the absence of a catalyst to promote replacement of all remaining replaceable N-hydrogen atoms with hydroxyalkyl groups, after which an alkaline catalyst such as KOH, NaOH, tertiary amine or quaternary hydroxide may be added to promote further reaction of the alkylene oxide with the hydroxyalkyl groups to produce any desired number of polyalkoxy chains of the desired length. The alkoxylation reaction of step B may be carried out at temperatures of from 80° to 180° C., preferably about 110 to 140° C. in a closed vessel. Those products are preferred which contain about 5 alkoxy groups per mole. The preferred alkylene oxide is ethylene oxide although propylene oxide or butylene oxide may also be employed.

In step C, 1 mole of the product of step B is quaternized in the presence or absence of a suitable organic solvent such as mineral oil, benzene, toluene, alcohols, ketones or the like, with one equivalent to one mole of an alkylating agent, whereby a tertiary amine group in the compound is converted to a quaternary ammonium group. The preferred alkylating agent is benzyl chloride. However, other alkylating agents may be employed, as for example, allyl, alkyl and aralkyl halides, sulfates and phosphates, alkylene oxides, and the like. For example, there may be employed allyl chloride, methyl bromide, ethyl chloride, dimethyl sulfate, diethyl sulfate, ethylene chlorhydrin, glycerol monochlorohydrin, epichlorohydrin, bis(chloromethyl)naphthalene, 1-chloro-1-phenyl-ethane, ethylene oxide, propylene oxide, and the like.

The quaternizing reaction of step C may be carried out desirably in the presence of about 5 to 20 percent, preferably about 10 percent, by weight of a solvent such as isopropanol and the like, which causes a slight increase in reaction rate, probably by reducing the viscosity of the mixture. About 0.1 to 2 percent, preferably about 1 percent, by weight of a catalyst such as potassium iodide may be employed if desired to also increase the reaction rate. When employing ethylene oxide or propylene oxide or the like as the alkylating agent, the tertiary amine should first be converted to its salt with a strong acid such as HCl, oxalic acid, p-toluene sulfonic acid or the like.

The resulting composition is a mixture in which the quaternary ammonium derivative of the alkoxylated amino diamide is present in predominant amounts. However, small amounts of unquaternized alkoxylated (tertiary amino) triamides and alkoxylated amino diamide compounds are also present in addition to unreacted quaternizing agent. When a fat or oil is employed, as the acylating agent, glycerol, glycerides, etc. are also present. Thus, when diethylene triamine is employed as the starting polyalkylene polyamine, the composition will contain in predominant amounts of at least 50 percent by weight, the quaternary ammonium derivative of the alkoxylated amino-diamide of the following formula:

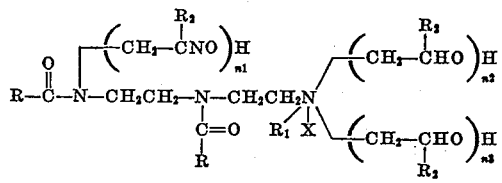

in which R is an unsaturated aliphatic radical of from about 7 to 21 carbon atoms; $R_1$ is selected from the group consisting of aralkyl, alkyl, allyl, and hydroxy alkyl; $R_2$ is selected from the group consisting of H and lower alkyl; $n_1$, $n_2$ and $n_3$ each have a value of at least 1 and a total of from about 4 to 20; and X is an anion such as chloride, bromide, sulfate, methyl sulfate, hydroxide, phosphate, acetate, stearate and the like. In the above formula, the sum of $n_1$, $n_2$ and $n_3$ is preferably about 5, R is derived from soybean fatty acids, $R_1$ is benzyl, $R_2$ is H, and X is Cl.

The composition produced in accordance with the above described process has been found to be highly effective for reducing corrosion in oil wells caused by sour or sweet brines. The corrosive action of oil field brines containing hydrogen sulfide, carbon dioxide, organic acids, salts and the like, has long been recognized as a source of very substantial economic losses in oil production equipment. It has been found that the composition of this invention is very effective in preventing corrosion to the pipes, rods, pumping, and other equipment made of metals such as iron, steel, ferrous alloys, and other metals and the like, used in producing and transporting crude oil.

The composition may be added to the oil well by various means. A solution of the composition of this invention in water may be added to the well but addition in the form of an organic solvent solution has been found to be more effective. Suitable organic solvents are mineral oil, kerosene, mineral spirits, xylene, toluene, methylated naphthalenes, alcohols such as isopropyl alcohol, and the like. These organic solvent solutions are ordinarily fed into the well annulus by means of a motor driven chemical injection pump or may be dumped periodically into the annulus by some other means. Optimum amounts of the composition are about 0.005 to 0.010 percent, particularly about 0.007 percent by weight of the oil and brine being treated. However, amounts ranging from about 0.1 to 0.0001 percent may be employed. For treating wells with packed-off tubing, the use of solid sticks or plugs containing the composition of this invention is especially convenient. These may be prepared by blending the inhibitor composition with a mineral wax, asphalt or resin.

The composition of this invention may also be employed for reducing corrosion to metals caused by other aqueous solutions such as distilled water, tap water, boiler water, water used in automobile radiators with or without alcohols, glycols, and other freezing oil depressants, aqueous brine solutions containing sodium chloride, sodium sulfate, sodium bicarbonate, calcium chloride, magnesium chloride and similar brines used for refrigeration whether or not containing ammonia, dilute aqueous solutions of hydrochloric acid, sulfuric acid, sulfurous acid, and the like.

It will of course be understood that the high surface activity of the composition of this invention promotes its use in other large fields of the technical arts. For instance, they can be used as wetting and frothing agents; for converting liquid or solid substances which per se are insoluble in water (such as hydrocarbons, higher alcohols, oils, fats, waxes and resins) into creamy emulsions, clear solutions or fine, stable, dispersions; for fulling textiles as cleansing agents in hard water; in tanning and mordanting processes; for dyeing acetate with insoluble dyestuffs; for producing foam in fire extinguishers; as a means for improving the absorptive power of fibrous bodies; and as an aid in softening baths for hides and skins.

In addition, these products are valuable in emulsifier systems of insecticide compositions and agricultural sprays such as DDT, 2,4–D, toxaphene, chlordane, dormant or mineral oil sprays, nicotine sulfate, Dieldrin, Aldrin, Lindane, sulfur, B.H.C., Heptachlor, I.P.C., Chloro I.P.C., Methoxychlor, etc.

These products are valuable for use as additives to petroleum products, as additives for fuel oils, hydraulic fluids, lubricating oils, cutting oils, and greases.

Other valuable uses are in metal cleaning compositions, acid pickling baths, dry cleaning compositions, froth flotation agents, additives for road building materials, as air entraining agents for concrete or cement; additives to asphalt compositions, plasticizers and modifiers for vinyl plastics, alkyd resins, phenolformaldehyde resins, and other types of polymeric-type plastic materials; for incorporation into adhesives, paint, linoleum; for use in bonding agents used in various insulating and building materials; as additives to pulp slurries to aid the beating operation in paper-making.

These products are also useful as wetting agents, rewetting agents, dispersing agents, detergents, penetrating agents, softening agents, cutting oils, dishwashing agents, antistatic agents, disinfectants, insecticides, mothproofing agents, bacteriocides, fungicides and biocides.

They are useful in the rayon industry as additives to the spinning bath. They are of value in hydraulic fluids to improve viscosity characteristics.

These products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

Other valuable uses are as solvents, as cleaning agents for paint brushes, as additives for paints, lacquers, and varnishes; as lubricants, as greases, and stuffing agents.

The following examples are illustrative of the instant invention and are not to be regarded as limitative. Parts are by weight unless otherwise indicated.

EXAMPLE 1

Into a 2-liter round bottom flask were placed 600 g. (0.66 mole) soybean oil and 103.2 g. (1 mole) diethylenetriamine. The mixture was heated 5 hours at 140° C. At the end of this time titration of amine consumed showed the reaction was 95.3% complete.

Six hundred thirty nine grams of the above product (about 0.91 mole) were treated with 223 grams (5.07 moles) of ethylene oxide in a stainless steel autoclave in the presence of 1.92 grams of sodium hydroxide catalyst. The ethoxylation was carried out at 130° C. by adding portions of ethylene oxide gas to the autoclave, keeping the reaction pressure at about 30 pounds pressure. The reaction was complete in 1½ hours.

The quaternization reaction was carried out in a one-liter round bottom flask. To 514 grams (0.54 mole) of the polyoxyethylated product obtained above, were added 88.5 g. (0.7 mole) benzyl chloride, 60.2 g. isopropanol and 6.02 g. of potassium iodide. The reaction mixture was stirred at 75° C. for ten hours. Analysis showed 83% conversion to quaternary by the mercuric acetate method of analysis (Pifer and Wollish; Analytical Chemistry, volume 24, page 300 [1952]). The corrosion inhibiting performance of this compound is shown in Table 1.

EXAMPLE 2

Into a 2-liter round bottom flask were placed 900 g. (1 mole) of soybean oil and 134.2 g. (1.3 moles) diethylene triamine. The mixture was heated at 140° C. for 6½ hours and then heated for 2 hours at 195–200° C. to insure completion of the reaction.

Nine hundred grams (1 mole) of the above product were added to a stainless steel autoclave and allowed to react with a total of 209 grams (4.75 moles) of ethylene oxide gas which was added in small portions to keep the pressure below 30 p.s.i. while keeping the reaction temperature at 128–134° C. No catalyst was used. The reaction was complete in 2 hours.

To 500 grams (0.45 mole) of the above product were added 79.2 grams (.626 mole) of benzyl chloride, 57.8 g. of isopropanol and 5.78 g. powdered KI. The reaction mixture was stirred at 75° C. for 15½ hours. At the end of this time, titration showed 62% of the amino groups had been converted to quaternary. The corrosion inhibiting performance of this product is shown in Table 1.

EXAMPLE 3

(For comparison purposes with Example 1—this is a product prepared from a saturated fatty acid.)

Two gram molar equivalents of stearic acid and 1 gram mole of diethylenetriamine were heated for 6 hours at 160° C. to form the diamide. The product was then treated at 128° C. with 5.1 gram moles ethylene oxide, by adding ethylene oxide portionwise over a period of 1⅓ hours in an autoclave at a pressure of 25–30 p.s.i.

The above product was quaternized with 1 gram mole of benzyl chloride in the presence of isopropanol and potassium iodide as described in Examples 1 and 2. (There was 60% conversion of amino as determined by titration.) The performance of this product is shown in Table 1.

EXAMPLE 4

(Using soybean oil fatty acid to illustrate that the glycerol from soybean oil does not contribute appreciably to performance, and also that the unsaturation causes an improvement over the stearic acid product.)

A product was prepared by exactly the same reaction conditions outlined in Example 1 and using exactly the same reactants and reagents, the only exception being that three moles of soya fatty acids were used in place of each mole of soybean oil as a starting material. In the final quaternization step the conversion of amino was also identical with Example 2 (62%).

The performance of this product is shown in Table 1.

EXAMPLE 5

(A monoamide quaternary for comparison with Example 1 which is a diamide-quaternary.)

One gram mole of soybean oil and 3 gram moles of diethylenetriamine were heated for 5 hours at 140° C. and the product then allowed to react with 4.6 gram moles moles of ethylene oxide in an autoclave. The ethylene oxide was added portionwise over a period of 1 hour while keeping the reaction temperature at 122° C. and the pressure at 20–30 p.s.i.

The monoamide product obtained above was treated with about two gram moles of benzyl chloride at 75° C. in the presence of isopropanol solvent and KI catalyst as described in Example 1. The was 59% conversion of amino by titration.

The performance of this product is shown in Table 1.

Evaluation of inhibitor

A "sour" brine was formulated by dissolving the following salts in 16 liters of water, and then passing in $H_2S$ and $CO_2$ simultaneously for 1 hour until saturated.

| | |
|---|---:|
| Anhydrous $Na_2SO_4$ _____g__ | 15.98 |
| $NaHCO_3$ _____g__ | 5.90 |
| NaCl _____g__ | 2,292.8 |
| $CaCl_2$ _____g__ | 854.4 |
| $MgCl_2$–$6H_2O$ _____g__ | 1,113.6 |

Typical analysis of $CO_2$ as NaHCO=.0003 g./cc.
Typical analysis of $H_2S$=.0017 g./cc.

Weighed SAE 1015 panels (1 x 2.75 x 0.038 inches) were immersed in a mixture of equal parts by volume of oil (Soltrol C, a clear liquid petroleum fraction obtained from Phillips Petroleum, sp. gr. 0.747 at 20° C.) and brine, together with predetermined amounts of inhibitor in small bottles which were then sealed and gently rotated for a week at room temperature. The panels were then descaled, cleaned and reweighed, correcting for descaling losses.

TABLE 1

| Tested Inhibitor Added | Percent Wt. loss at following weight concentrations of active ingredient in oil plus brine | | | |
|---|---|---|---|---|
| | .025% | .007% | .0025% | .0014% |
| No inhibitor (Blank) | .080 | .080 | .080 | .080 |
| (Example 1) | | .000 | | .059 |
| (Example 2) | .003 | .001 | .005 | .021 |
| (Example 3) | | .084 | | .093 |
| (Example 4) | | { .004 / .006 } | | { .013 / .015 / .030 } |
| (Example 5) | | { .049 / .042 } | | { .086 / .092 } |

The results shown in Table 1 indicate that the compositions prepared in accordance with this invention from unsaturated higher fatty acids have corrosion inhibiting properties very much better than those prepared from corresponding saturated fatty acids or with an insufficient proportion of unsaturated higher fatty acid (monoamide).

Twenty-five percent by weight solutions of the products of Examples 1 and 2 in water and in mineral spirits (boiling range 309° F. (5%) to 376° F. (95%); sp. grav. 0.756 to 0.786, 60/60° F. were prepared and their corrosion inhibiting properties tested in 1:1 oil-brine as described above under "Evaluation of Inhibitor." Table 2 shows the comparative results.

TABLE 2

| | Percent Wt. loss at the following concentrations of active ingredient | |
|---|---|---|
| | 0.007% | 0.014% |
| Aqueous solution (Example 1) | 0.012 | 0.143 |
| Mineral spirit solution (Example 1) | 0.000 | 0.059 |
| Aqueous solution (Example 2) | 0.012 | 0.114 |
| Mineral spirit solution (Example 2) | 0.004 | 0.022 |

The results shown in Table 2 indicate that the composition of this invention are more effective for inhibiting corrosion when employed in an organic solvent solution than when employed in aqueous solution. In addition to the mineral spirits concentrate described above, a concentrate containing 50 to 90% by weight of the product of Example 1, 2 or 4 in isopropanol solution has been found highly effective for inhibiting corrosion by addition to corrosive compositions. Other organic solvents which may be employed in formulating concentrates include xylene, Stoddard solvent, kerosene, ethanol, carbon tetrachloride, Butyl Cellosolve and the like.

Various modifications and variations of this invention will be obvious to the person skilled in the art and it is to be understood that such modifications and variations are included within the purview of this application and the spirit and scope of the appended claims.

We claim:

1. A process comprising (A) reacting under amidating conditions one mole of a polyalkylene polyamine with two molecular equivalents of an unsaturated higher fatty acid compound to form the corresponding aliphatic aminodiamide, (B) reacting the product of step A with more than sufficient lower alkylene oxide of from about 2 to 4 carbon atoms to condense with all the remaining replaceable N-hydrogen atoms therein, and (C) reacting one mole of the product of step B with one equivalent to one mole of an alkylating agent to form the corresponding quaternary ammonium derivative.

2. A process as defined in claim 1 wherein the polyalkylene polyamine is diethylene triamine.

3. A process as defined in claim 1 wherein the alkylene oxide is ethylene oxide.

4. A process as defined in claim 1 wherein the alkylating agent is benzyl chloride.

5. A process as defined in claim 1 wherein the unsaturated fatty acid compound is soybean oil employed in a ratio of two-thirds of a mole for each mole of polyalkylene polyamine.

6. A composition made in accordance with the process of claim 1.

7. A corrosion inhibiting concentrate comprising a solution of the composition as defined in claim 6 in an organic solvent in a concentration of at least 25% by weight.

8. A corrosion inhibiting concentrate comprising a solution of the composition as defined in claim 6 in mineral spirits in a concentration of at least 25% by weight.

9. A corrosion inhibiting concentrate comprising a solution of the composition as defined in claim 6 in isopropanol in a concentration of at least 25% by weight.

10. A corrosion inhibited composition comprising an aqueous solution normally corrosive toward metal surfaces and a small amount sufficient to inhibit such corrosion of a composition as defined in claim 6.

11. A corrosion inhibited composition comprising an aqueous brine solution normally corrosive toward metal surfaces and a small amount sufficient to inhibit such corrosion of a composition as defined in claim 6.

12. A method of inhibiting the corrosion of ferrous metal surfaces in contact with a composition normally corrosive thereto which comprises dispersing in the said composition a small amount sufficient to inhibit such corrosion of a composition as defined in claim 6.

13. A method of inhibiting the corrosion of ferrous metal surfaces in contact with a composition comprising an oil and an aqueous brine solution which comprises dispersing in said composition a small amount sufficient to inhibit such corrosion of a composition as defined in claim 6.

14. A process comprising (A) reacting under amidating conditions one mole of diethylene triamine with two molecular equivalents of an unsaturated higher fatty acid compound to form the corresponding aliphatic aminodiamide, (B) reacting the product of step A with more than sufficient ethylene oxide to condense with all the remaining replaceable N-hydrogen atoms therein, and (C) reacting one mole of the product of step B with one mole of benzyl chloride to form the corresponding quaternary ammonium derivative.

15. A composition made in accordance with the process of claim 6.

16. A corrosion inhibiting concentrate comprising a solution of the composition as defined in claim 15 in an organic solvent in a concentration of at least 25% by weight.

17. A corrosion inhibited composition comprising an aqueous solution normally corrosive toward metal surfaces and a small amount sufficient to inhibit such corrosion of a composition as defined in claim 15.

18. A corrosion inhibited composition comprising an aqueous brine solution normally corrosive toward metal surfaces and a small amount sufficient to inhibit such corrosion of a composition as defined in claim 15.

19. A method of inhibiting the corrosion of ferrous metal surfaces in contact with a composition normally corrosive thereto which comprises dispersing in the said composition a small amount sufficient to inhibit such corrosion of a composition as defined in claim 15.

20. A method of inhibiting the corrosion of ferrous metal surfaces in contact with a composition comprising an oil and an aqueous brine solution which comprises dispersing in said composition a small amount sufficient to inhibit such corrosion of a composition as defined in claim 15.

References Cited in the file of this patent

UNITED STATES PATENTS

| | | |
|---|---|---|
| 1,912,849 | Kranzlein et al. | June 6, 1933 |
| 2,149,527 | Kartaschoff | Mar. 7, 1939 |
| 2,267,965 | Wilson | Dec. 30, 1941 |
| 2,345,570 | Bley | Apr. 4, 1944 |
| 2,466,517 | Blair et al. | Apr. 5, 1949 |
| 2,468,163 | Blair et al. | Apr. 26, 1949 |
| 2,474,202 | Rust | June 21, 1949 |
| 2,562,384 | Mannheimer | July 31, 1951 |
| 2,583,772 | Gunderson | Jan. 29, 1952 |
| 2,598,213 | Blair | May 27, 1952 |
| 2,609,931 | Rodman et al. | Sept. 9, 1952 |
| 2,640,029 | Blair et al. | May 26, 1953 |
| 2,659,693 | Lytle | Nov. 17, 1953 |
| 2,663,648 | Jelling | Dec. 22, 1953 |
| 2,668,165 | Carpenter | Feb. 2, 1954 |
| 2,681,354 | Kelley et al. | June 15, 1954 |
| 2,686,795 | Koebner | Aug. 17, 1954 |
| 2,717,881 | Bird et al. | Sept. 13, 1955 |
| 2,720,490 | Oxford | Oct. 11, 1955 |